United States Patent
Ariyama (10) Patent No.: US 11,156,393 B2
(45) Date of Patent: Oct. 26, 2021

(54) AIR-CONDITIONING APPARATUS WITH PRESSURE CONTROL FOR DEFROSTING AND HEATING

(71) Applicant: Mitsubishi Electric Corporation, Tokyo (JP)

(72) Inventor: Tadashi Ariyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 277 days.

(21) Appl. No.: 16/300,995

(22) PCT Filed: Jul. 7, 2016

(86) PCT No.: PCT/JP2016/070174
§ 371 (c)(1),
(2) Date: Nov. 13, 2018

(87) PCT Pub. No.: WO2018/008130
PCT Pub. Date: Jan. 11, 2018

(65) Prior Publication Data
US 2019/0383534 A1    Dec. 19, 2019

(51) Int. Cl.
*F25B 41/31* (2021.01)
*F25B 41/38* (2021.01)
(Continued)

(52) U.S. Cl.
CPC .......... *F25B 47/025* (2013.01); *F25B 41/31* (2021.01); *F25B 41/385* (2021.01); *F25B 47/022* (2013.01);
(Continued)

(58) Field of Classification Search
CPC .......... F25B 47/022; F25B 2313/0251; F25B 2313/02532; F25B 2313/02533;
(Continued)

(56) References Cited

U.S. PATENT DOCUMENTS 10,775,060 B2 *   9/2020   Takenaka ............... F25B 13/00
2006/0080989 A1 *   4/2006   Aoki ....................... F25B 13/00
                                                    62/324.4

FOREIGN PATENT DOCUMENTS

JP          2008-175410 A       7/2008
JP          2012-107790 A       6/2012
WO       WO-2015059945 A1 *  4/2015   .............. F24F 13/30

OTHER PUBLICATIONS

International Search Report of the International Searching Authority dated Oct. 4, 2016 for the corresponding international application No. PCT/JP2016/070174 (and English translation).

* cited by examiner

Primary Examiner — Edward F Landrum
Assistant Examiner — Daniel C Comings
(74) Attorney, Agent, or Firm — Posz Law Group, PLC (57) ABSTRACT

An air-conditioning apparatus includes heat-source-side units each including a compressor and a heat-source-side heat exchanger, a load-side heat exchanger and a load-side expansion device, a first header, a second header, bypass expansion devices, circuit switching units, discharge pressure sensors, bypass pressure sensors, and a controller configured to control, in a heat-source-side unit in defrosting mode, the circuit switching unit in such a manner that a portion of refrigerant discharged from the compressor flows into the heat-source-side heat exchanger and configured to control, in the heat-source-side unit in defrosting mode, an opening degree of the bypass expansion device in the heat-source-side unit in such a manner that a value representing a difference between a value obtained by the discharge pressure sensor and a value obtained by the bypass pressure sensor is equal to or greater than a predetermined value.

3 Claims, 3 Drawing Sheets

(51) Int. Cl.
*F25B 47/02* (2006.01)
*F25B 41/385* (2021.01)

(52) U.S. Cl.
CPC .............. *F25B 2313/0251* (2013.01); *F25B 2313/02532* (2013.01); *F25B 2313/02533* (2013.01); *F25B 2400/23* (2013.01); *F25B 2500/31* (2013.01); *F25B 2600/17* (2013.01); *F25B 2600/2513* (2013.01); *F25B 2700/1931* (2013.01)

(58) Field of Classification Search
CPC .. F25B 2313/02542; F25B 2313/02543; F25B 2600/17; F25B 41/385; F25B 47/025; F25B 2500/31
See application file for complete search history.

AIR-CONDITIONING APPARATUS WITH PRESSURE CONTROL FOR DEFROSTING AND HEATING

CROSS REFERENCE TO RELATED APPLICATION

This application is a U.S. national stage application of PCT/JP2016/070174 filed on Jul. 7, 2016, the contents of which are incorporated herein by reference.

TECHNICAL FIELD

The present invention relates to an air-conditioning apparatus including heat-source-side units.

BACKGROUND ART

When an air-conditioning apparatus operates in heating mode at a low outdoor temperature, frost may form on the surfaces of the fins of an outdoor heat exchanger that acts as an evaporator and refrigerant pipes. When frost forms on the surfaces of the fins of the outdoor heat exchanger and the refrigerant pipes, pressure loss of the air flow path of the outdoor heat exchanger increases, and heat transfer performance thus decreases. Consequently, it is necessary to cause the air-conditioning apparatus to regularly stop operation in heating mode and cause an outdoor unit to operate in defrosting mode. However, as operation in heating mode stops while the outdoor unit operates in defrosting mode, the occupants of a room are exposed to cold air.

To address the above problem, an air-conditioning system has been presented that operates in heating mode even while operating in defrosting mode to maintain comfortability during defrosting mode (e.g., see Patent Literature 1). Patent Literature 2 discloses another example of an air-conditioning apparatus including outdoor units. When the air-conditioning apparatus disclosed in Patent Literature 2 operates in defrosting mode, the air-conditioning apparatus determines the magnitude of a load applied to the whole system. Thus, the air-conditioning apparatus operates in defrosting mode only operating in defrosting mode in parallel with heating mode does not make the occupants uncomfortable due to a decrease in the indoor temperature.

CITATION LIST

Patent Literature

Patent Literature 1: Japanese Unexamined Patent Application Publication No, 2008-175410
Patent Literature 2: Japanese Unexamined Patent Application Publication No. 2012-107790

SUMMARY OF INVENTION

Technical Problem

When an air-conditioning apparatus including outdoor units, as described in Patent Literature 1 and 2, operates in defrosting mode while continuously operating in heating mode, the pressure of refrigerant in a heat exchanger to be defrosted decreases to as low as the suction pressure of a compressor (low saturation pressure). Thus, the heat of refrigerant exchanged in defrosting mode is only the sensible heat. Consequently, available defrosting capacity is not sufficient against the flow rate of the refrigerant.

The present invention has been made to solve the above problem, and an objective of the present invention is to provide, by using multiple heat-source-side units, an air-conditioning apparatus capable of maintaining high heating capacity and increasing defrosting capacity when the air-conditioning apparatus operates in defrosting mode while continuously operating in heating mode.

Solution to Problem

An air-conditioning apparatus according to an embodiment of the present invention includes heat-source-side units each including a compressor and a heat-source-side heat exchanger, a load-side unit including a load-side heat exchanger and a load-side expansion device, a first header connecting a refrigerant pipe connected to the load-side heat exchanger and connecting refrigerant pipes each connected to a corresponding one of the compressors, a second header connecting a refrigerant pipe connected to the load-side expansion device and connecting refrigerant pipes each connected to a corresponding one of the heat-source-side heat exchangers, bypass expansion devices each provided between the second header and a corresponding one of the heat-source-side heat exchangers, circuit switching units each provided in a corresponding one of the heat-source-side units and each configured to connect a corresponding one of the heat-source-side heat exchangers to one of a suction portion and a discharge portion of a corresponding one of the compressors, discharge pressure sensors each provided to the discharge portion of a corresponding one of the compressors, bypass pressure sensors each provided between the second header and a corresponding one of the bypass expansion devices, and a controller configured to cause the heat-source-side heat exchanger in at least one of the heat-source-side units to be defrosted and cause the heat-source-side heat exchanger of at least one remaining heat-source-side unit of the heat-source-side units to act as an evaporator. The controller includes a flow-path control unit configured to control the circuit switching unit in the at least one of the heat-source-side units in such a manner that a portion of refrigerant discharged from a corresponding one of the compressors flows into a corresponding one of the heat-source-side heat exchangers, and a pressure control unit configured to control an opening degree of the bypass expansion device in the at least one of the heat-source-side units in such a manner that a value representing a difference between pressure measured by a corresponding one of the discharge pressure sensors and pressure measured by a corresponding one of the bypass pressure sensors is equal to or greater than a predetermined value.

Advantageous Effects of Invention

According to an embodiment of the present invention, when the air-conditioning apparatus including multiple heat-source-side units causes at least one of the heat-source-side units to operate in defrosting mode while continuously operating in heating mode, by appropriately controlling the pressure of a heat-source-side heat exchanger to be defrosted in such a manner that a value representing a difference between the pressure of refrigerant at the downstream of the heat-source-side heat exchanger to be defrosted and the discharge pressure of the compressor is equal to or greater than a predetermined value, it is possible not only to increase defrosting capacity using the latent heat of the refrigerant, but also to maintain high heating capacity.

DESCRIPTION OF EMBODIMENT

Embodiment 1

Figure 1:
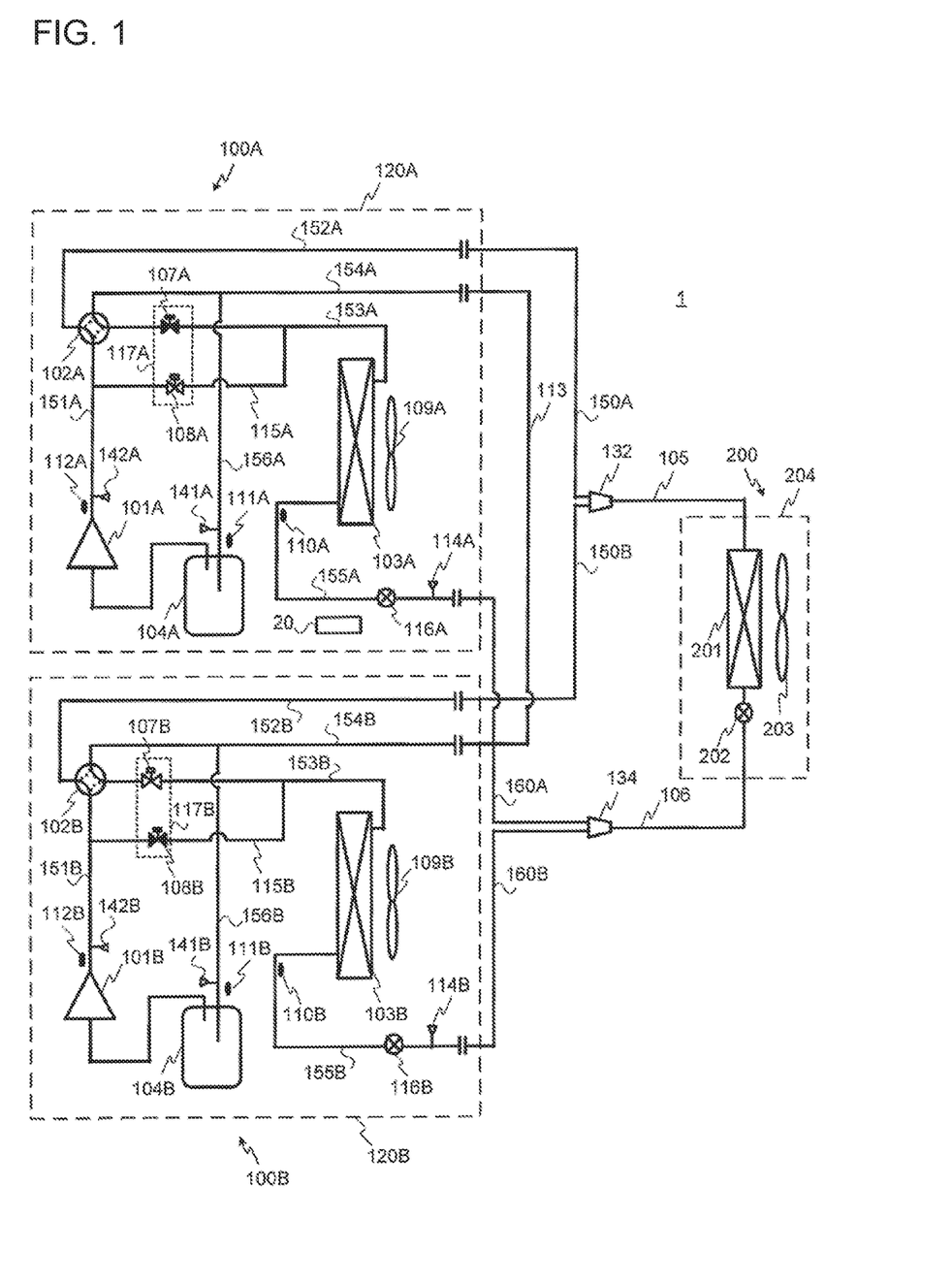
FIG. 1 is a refrigerant circuit diagram illustrating a configuration example of an air-conditioning apparatus according to Embodiment 1 of the present invention.

FIG. 1 is a refrigerant circuit diagram illustrating a configuration example of an air-conditioning apparatus according to Embodiment 1 of the present invention. The configuration of the refrigerant circuit of the air-conditioning apparatus in Embodiment 1 is described with reference to FIG. 1. An air-conditioning apparatus 1 shown in FIG. 1 is installed in a structure such as a building and an apartment building and can cool and heat an air-conditioned space using a heat-pump refrigeration cycle that circulates air-conditioning refrigerant. It should be noted that relative size relationships between components shown in the figures used for describing Embodiment 1 may differ from actual ones.
[Outline of Air-Conditioning Apparatus]

As shown in FIG. 1, the air-conditioning apparatus 1 includes a heat-source-side unit 100A, a heat-source-side unit 100B, and a load-side unit 200. The heat-source-side unit 100A and the heat-source-side unit 100B are installed outdoors, and the load-side unit 200 is installed indoors. Refrigerant pipes connect the heat-source-side unit 100A, the heat-source-side unit 100B, and the load-side unit 200 to each other. The heat-source-side unit 100A, the heat-source-side unit 100B, and the load-side unit 200 constitute a main refrigerant circuit and circulate refrigerant in the circuit to heat and cool the air-conditioned space.

Among the refrigerant pipes, there are a refrigerant pipe 105 through which gas refrigerant flows in heating mode and a refrigerant pipe 106 through which liquid refrigerant or two-phase gas-liquid refrigerant flows. As refrigerant pipes that connect the load-side unit 200 and the heat-source-side unit 100A to each other and that connect the load-side unit 200 and the heat-source-side unit 100B to each other, a refrigerant pipe 150A, a refrigerant pipe 150B, a refrigerant pipe 160A, and a refrigerant pipe 160B are provided. A connection pipe 113 is also provided as a refrigerant pipe that connects the heat-source-side unit 100A and the heat-source-side unit 100B to each other.

A refrigerant that circulates in the refrigerant circuit is not limited to a particular refrigerant and is, for example, a hydrofluoroolefin (HFO) or R410A or R404A, which is an HFC refrigerant. The refrigerant may be, for example, $CO_2$ or ammonia, which is a natural refrigerant.

Embodiment 1 shows a case in which the air-conditioning apparatus 1 includes two heat-source-side units and one load-side unit that connect to each other. However, as long as the number of the heat-source-side units is two or more, the number of these units is not limited to the example shown in FIG. 1.

[Heat-Source-Side Unit]

The configuration of the heat-source-side unit 100A shown in FIG. 1 is described. As the configuration of the heat-source-side unit 100E is similar to that of the heat-source-side unit 100A, detailed explanations for the configuration of heat-source-side unit 100E are omitted.

As shown in FIG. 1, the heat-source-side unit 100A includes a compressor 101A, a four-way valve 102A, a heat-source-side heat exchanger 103k an accumulator 104A, and an air-sending device 109A. The discharge portion of the compressor 101A is connected to the four-way valve 102A with a refrigerant pipe 151A interposed between the compressor 101A and the four-way valve 102A. The four-way valve 102A is connected to the heat-source-side heat exchanger 103A with a refrigerant pipe 153A interposed between the four-way valve 102A and the heat-source-side heat exchanger 103A. A bypass 115A for connecting the discharge portion of the compressor 101A and the heat-source-side heat exchanger 103A to each other is provided. The refrigerant pipe 153A has a main-circuit valve 107A, and the bypass 115A has a bypass valve 108A. The four-way valve 102A is connected not only to the refrigerant pipe 151A and the refrigerant pipe 153A but also to a refrigerant pipe 152A and a refrigerant pipe 154A.

The heat-source-side heat exchanger 103A is connected to a refrigerant pipe 155A on the portion opposite to the portion where the heat-source-side heat exchanger 103A is connected to the refrigerant pipe 153A. The refrigerant pipe 155A has a bypass expansion device 116A. The refrigerant inlet of the accumulator 104A is connected to the refrigerant pipe 154A with the refrigerant pipe 156A interposed between the accumulator 104A and the refrigerant pipe 154A. The refrigerant outlet of the accumulator 104A is connected to the suction port of the compressor 101A.

The refrigerant pipe 151A provided to the discharge portion of the compressor 101A has a discharge temperature sensor 112A and a discharge pressure sensor 142A. The refrigerant pipe 156A provided to the refrigerant inlet portion of the accumulator 104A has an inflow temperature sensor 111A and an inflow pressure sensor 141A. A refrigerant pipe 155A has a heat-exchanger temperature sensor 110A close to the position where the refrigerant pipe 155A is connected to the heat-source-side heat exchanger 103A. The refrigerant pipe 155A has a bypass pressure sensor 114A with the bypass expansion device 116A interposed between the heat-source-side heat exchanger 103A and the bypass pressure sensor 114A.

In addition to the configuration described above, a heat-source-side housing 120A houses a controller 20 that controls the air-conditioning apparatus 1. Each sensor is connected to the controller 20 via a signal line. The configuration of the controller 20 is described later in detail. The setting place of the controller 20 is not limited to a place in the heat-source-side unit 100A, and may be a place in the heat-source-side unit 100B or the load-side unit 200. As long as the controller 20 electrically is connected to these units to be capable of receiving and sending a signal through a wired or wireless connection, the setting place of the controller 20 is not limited to places in these units.

The compressor 101A suctions and compresses refrigerant and discharges high-temperature, high-pressure refrigerant. The four-way valve 102A changes a direction in which refrigerant flows in the refrigerant circuit depending on whether the air-conditioning apparatus 1 operates in cooling mode or heating mode. Specifically, for operation in cooling mode, the four-way valve 102A connects the refrigerant pipe 151A to the refrigerant pipe 153A and connects the refrigerant pipe 152A to the refrigerant pipe 154A. Meanwhile, for operation in heating mode, the four-way valve 102A connects the refrigerant pipe 151A to the refrigerant pipe 152A and connects the refrigerant pipe 153A to the refrigerant pipe 154A.

It should be noted that when the air-conditioning apparatus 1 operates in cooling mode, the heat-source-side heat exchanger 103A acts as a condenser. Hereinafter, operation of the heat-source-side unit 100A when the heat-source-side heat exchanger 103A acts as a condenser is referred to as cooling mode. Meanwhile, operation of the heat-source-side unit 100A when the heat-source-side heat exchanger 103A acts as an evaporator is referred to as heating mode. Operation to defrost the heat-source-side heat exchanger 103A in the heat-source-side unit 100A is referred to as defrosting mode.

The heat-source-side heat exchanger 103A exchanges heat between the surrounding air and refrigerant flowing through the heat-source-side heat exchanger 103A. When the heat-source-side heat exchanger 103A acts as an evaporator, the heat-source-side heat exchanger 103A evaporates and gasifies the refrigerant. When the heat-source-side heat exchanger 103A acts as a radiator (condenser), the heat-source-side heat exchanger 103A condenses and liquefies the refrigerant. In Embodiment 1, the number of the heat-source-side heat exchangers 103A is one. However, the number of the heat-source-side heat exchangers 103A may be two or more.

The air-sending device 109A sends air to the heat-source-side heat exchanger 103A. The accumulator 104A is provided between the four-way valve 102A and the compressor 101A and stores excess refrigerant. The accumulator 104A is, for example, a container that stores excess refrigerant.

The main-circuit valve 107A and the bypass valve 108A are, for example, solenoid valves and regulate the flow rate of refrigerant flowing in the refrigerant circuit by controlling the opening degree of each valve. The main-circuit valve 107A is provided in a flow path between the four-way valve 102A and the heat-source-side heat exchanger 103A. The bypass valve 108A is provided in a flow path between the discharge portion of the compressor 101A and the heat-source-side heat exchanger 103A. The main-circuit valve 107A and the bypass valve 108A constitute a circuit switching unit 117A that connects the heat-source-side heat exchanger 103A to the suction portion or discharge portion of the compressor 101A.

The heat-exchanger temperature sensor 110A, the inflow temperature sensor 111A, and the discharge temperature sensor 112A are, for example, thermistors. The heat-exchanger temperature sensor 110A measures the temperature of refrigerant flowing through the heat-source-side heat exchanger 103A. The inflow temperature sensor 111A measures the temperature of refrigerant flowing into the accumulator 104A. The discharge temperature sensor 112A measures the temperature of refrigerant discharged from the compressor 101A.

The heat-exchanger temperature sensor 110A is, for example, attached to the heat-source-side heat exchanger 103A. The heat-exchanger temperature sensor 110A measures the temperature of refrigerant on the refrigerant outlet portion of the heat-source-side heat exchanger 103A in each operation state of the cooling mode and defrosting mode of the air-conditioning apparatus 1. As shown in FIG. 1, the heat-exchanger temperature sensor 110A may also be provided between the heat-source-side heat exchanger 103A and the bypass expansion device 116A. In this instance, the heat-exchanger temperature sensor 110A measures the temperature of refrigerant flowing into the heat-source-side heat exchanger 103A when the heat-source-side unit 100A operates in heating mode. Thus, the controller 20 can determine whether the heat-source-side unit 100A is operating in defrosting mode or heating mode, on the basis of the temperature measured by the heat-exchanger temperature sensor 110A.

The inflow pressure sensor 141A, the discharge pressure sensor 142A, and the bypass pressure sensor 114A are sensors for measuring the pressure of refrigerant. The inflow pressure sensor 141A measures the pressure of the refrigerant flowing into the accumulator 104A. The discharge pressure sensor 142A measures the pressure of the refrigerant discharged from the compressor 101A. The bypass pressure sensor 114A measures the pressure of refrigerant flowing out from the bypass expansion device 116A when the heat-source-side heat exchanger 103A is defrosted.

The controller 20 can obtain the saturation temperature of the refrigerant flowing into the accumulator 104A from the value of the pressure measured by the inflow pressure sensor 141A. The controller 20 can determine whether or not the refrigerant flowing into the accumulator 104A is superheated gas by comparing the saturation temperature and the temperature measured by the inflow temperature sensor 111A.

The controller 20 can obtain the saturation temperature of the refrigerant discharged from the compressor 101A from the value of the pressure measured by the discharge pressure sensor 142A. The controller 20 can determine whether or not the refrigerant discharged from the compressor 101A is superheated gas by comparing the saturation temperature and the temperature measured by the discharge temperature sensor 112A.

The controller 20 can determine whether or not the heat-source-side heat exchanger 103A is being defrosted using the latent heat of the refrigerant by comparing the pressure measured by the bypass pressure sensor 114A and the pressure measured by the discharge pressure sensor 142A. It should be noted that the refrigerant pipe 155A may have a refrigerant heat exchanger for subcooling refrigerant to be supplied to the load-side unit 200.

[Load-Side Unit]

The configuration of the load-side unit 200 shown in FIG. 1 is described. The load-side unit 200 includes a load-side heat exchanger 201, a load-side expansion device 202, and an air-sending device 203. A load-side housing 204 houses these components. The load-side heat exchanger 201 and the load-side expansion device 202 are connected in series. The load-side heat exchanger 201 is connected to the refrigerant pipe 105, and the load-side expansion device 202 is connected to the refrigerant pipe 106.

The load-side heat exchanger 201 exchanges heat between the air of the air-conditioned space and refrigerant flowing through the load-side heat exchanger 201. When the load-side heat exchanger 201 acts as an evaporator, the load-side heat exchanger 201 evaporates and gasifies the refrigerant. Meanwhile, when the load-side heat exchanger 201 acts as a radiator, the load-side heat exchanger 201 condenses and liquefies the refrigerant. The air-sending device 203 sends air to the load-side heat exchanger 201.

The load-side expansion device 202 acts as a pressure-reducing valve and an expansion valve and thus reduces the pressure of the refrigerant and expands the refrigerant. The load-side expansion device 202 is, for example, an electronic expansion valve whose opening degree can be variably controlled. Thus, the load-side expansion device 202 can precisely control the flow rate of refrigerant by controlling the opening degree of the valve. The load-side expansion device 202 may be a reasonable refrigerant flow rate control unit such as a capillary tube.

[Configuration of Connection Between Units]

A header 132 that connects the refrigerant pipe 105 and connects the refrigerant pipe 150A and the refrigerant pipe 150B is provided between the load-side unit 200 and the heat-source-side unit 100A and the heat-source-side unit 100B. The refrigerant pipe 150A is connected to the refrigerant pipe 152A, and the refrigerant pipe 150B is connected to the refrigerant pipe 152B. A header 134 that connects the refrigerant pipe 106 and connects the refrigerant pipe 160A and the refrigerant pipe 160B is also provided. The refrigerant pipe 160A is connected to the refrigerant pipe 155A, and the refrigerant pipe 160B is connected to the refrigerant pipe 155B. The connection pipe 113 is connected to the refrigerant pipe 154A in the heat-source-side unit 100A and the refrigerant pipe 154B in the heat-source-side unit 100B.

[Configuration of Controller]

Figure 2:
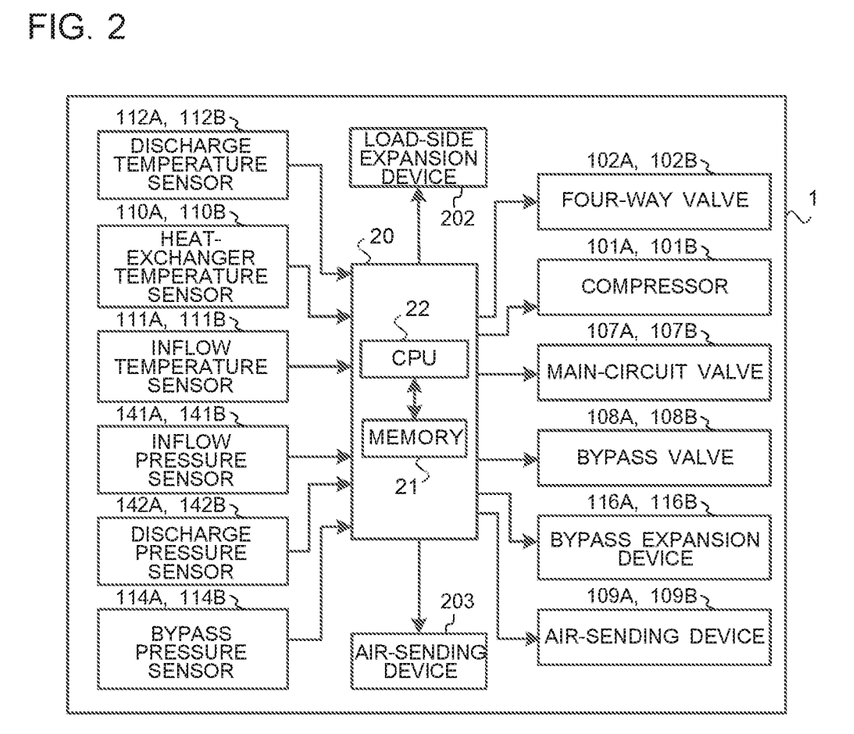
FIG. 2 is a functional block diagram for explaining control performed by the air-conditioning apparatus shown in FIG. 1.

FIG. 2 is a functional block diagram for explaining control performed by the air-conditioning apparatus shown in FIG. 1. As shown in FIG. 2, the controller 20 includes a memory 21 that stores a program and a central processing unit (CPU) 22 that performs processing in accordance with the program. The memory 21 is, for example, a nonvolatile memory. The controller 20 is connected to the compressor 101A, the compressor 101B, the air-sending device 109A, the air-sending device 109B, and the air-sending device 203 via signal lines. The controller 20 is connected to the main-circuit valve 107A, a main-circuit valve 107B, the bypass valve 108A, a bypass valve 108B, the four-way valve 102A, a four-way valve 102B, the bypass expansion device 116A, a bypass expansion device 116B, and the load-side expansion device 202 via signal lines.

The controller 20 also is connected to the heat-exchanger temperature sensor 110A, a heat-exchanger temperature sensor 110B, the inflow temperature sensor 111A, an inflow temperature sensor 111B, the discharge temperature sensor 112A, and a discharge temperature sensor 112B via signal lines. These temperature sensors input temperature measurement signals each indicating the value of a temperature to the controller 20. Moreover, the controller 20 is connected to the inflow pressure sensor 141A, an inflow pressure sensor 141B, the discharge pressure sensor 142A, a discharge pressure sensor 142B, and the bypass pressure sensor 114A via signal lines. These pressure sensors input pressure measurement signals each indicating the value of pressure to the controller 20. The controller 20 connects via a signal line to a remote control (not shown) installed indoors.

In accordance with an instruction input from the remote control (not shown) and a measurement signal input from each sensor, the controller 20 activates and stops the compressor 101A the compressor 101B, the air-sending device 109A, the air-sending device 109B, and the air-sending device 203 and controls the operating frequencies of these devices. In accordance with an instruction input from the remote control (not shown) and a measurement signal input from each sensor, the controller 20 also controls opening and closing of the main-circuit valve 107A, the main-circuit valve 107B, the bypass valve 108A, and the bypass valve 108E and changing of flow paths in the four-way valve 102A and the four-way valve 102B. The controller 20 controls the opening degree of each of the bypass expansion device 116A, the bypass expansion device 116B, and the load-side expansion device 202 in accordance with an instruction input from the remote control (not shown) and a measurement signal input from each sensor.

Figure 3:
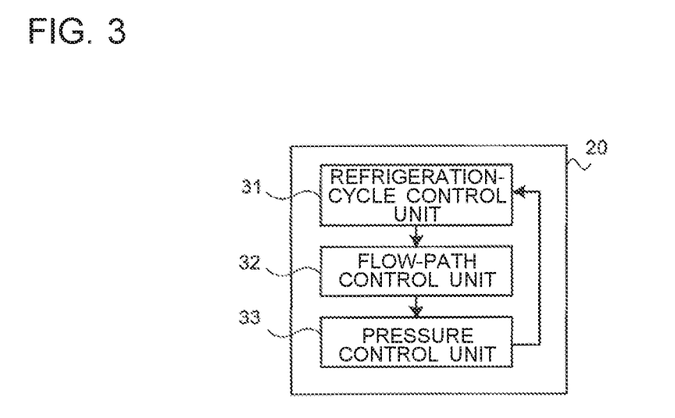
FIG. 3 is a functional block diagram illustrating a configuration example of a controller shown in FIG. 2.

FIG. 3 is a functional block diagram illustrating a configuration example of the controller shown in FIG. 2. As shown in FIG. 3, the controller 20 includes a refrigeration-cycle control unit 31, a flow-path control unit 32, and a pressure control unit 33. By the CPU 22 shown in FIG. 2 running a program, the refrigeration-cycle control unit 31, the flow-path control unit 32, and the pressure control unit 33 are incorporated into the air-conditioning apparatus 1.

When the refrigeration-cycle control unit 31 receives from the remote control (not shown) an instruction to operate in heating mode, the refrigeration-cycle control unit 31 activates the compressor 101A, the compressor 101B, the air-sending device 109A, the air-sending device 109B, and the air-sending device 203 while causing the main-circuit valve 107A and the main-circuit valve 107B to be open, causing the bypass valve 108A and the bypass valve 108B to be closed, and causing the bypass expansion device 116A and the bypass expansion device 116B to be fully open. The refrigeration-cycle control unit 31 controls the operating frequencies of the compressor 101A, the compressor 101B, the air-sending device 109A, the air-sending device 109B, and the air-sending device 203 and the opening degree of the load-side expansion device 202 on the basis of a value obtained by each sensor.

The refrigeration-cycle control unit 31 monitors temperatures measured by the heat-exchanger temperature sensor 110A and the heat-exchanger temperature sensor 110B. When the value of a temperature measured by either the heat-exchanger temperature sensor 110A or the heat-exchanger temperature sensor 110B is equal to or greater than a predetermined threshold, the refrigeration-cycle control unit 31 determines that the performance as an evaporator has decreased due to frost formed on the heat-source-side heat exchanger associated with the sensor. The refrigeration-cycle control unit 31 notifies the flow-path control unit 32 of the heat-source-side unit including the heat-source-side heat exchanger determined to need to be defrosted. It should be noted that when the refrigeration-cycle control unit 31 receives from the remote control (not shown) input specifying a heat-source-side unit that needs to operate in defrosting mode, the refrigeration-cycle control unit 31 may notify the flow-path control unit 32 of the heat-source-side unit to be caused to operate in defrosting mode.

The flow-path control unit 32 controls the circuit switching unit of the heat-source-side unit notified by the refrigeration-cycle control unit 31 and causes a portion of refrigerant discharged from the compressor to flow into the heat-source-side heat exchanger. The flow-path control unit 32 notifies the pressure control unit 33 of the heat-source-side unit to be caused to operate in defrosting mode. For instance, when the heat-source-side unit 100A operates in defrosting mode, the flow-path control unit 32 opens the bypass valve 108A and closes the main-circuit valve 107A. The flow-path control unit 32 notifies the pressure control unit 33 that the heat-source-side unit 100A is caused to operate in defrosting mode. It should be noted that regarding the control of the heat-source-side unit 100B in heating mode, the flow-path control unit 32 controls a circuit switching unit 117B in such a manner that the bypass valve 108A is closed and the main-circuit valve 107A is open.

In the heat-source-side unit 100A notified by the flow-path control unit 32, the pressure control unit 33 controls the opening degree of the bypass expansion device 116A in such a manner that a value representing a difference between pressure Ph measured by the discharge pressure sensor 142A and pressure Pb measured by the bypass pressure sensor 114A is equal to or greater than a predetermined value $\Delta p$.

[Air-Conditioning Apparatus Heating Mode Operation]

Next, operation when the air-conditioning apparatus 1 operates in heating mode is described. In the heat-source-side unit 100A and the heat-source-side unit 100B, the main-circuit valve 107A and the main-circuit valve 107B are open whereas the bypass valve 108A and the bypass valve 108B are closed. Hereinafter, high pressure and low pressure are used to show a relative relationship in pressure in the refrigerant circuit. Similarly to pressure, a high temperature and a low temperature are used to show a relative relationship in temperature in the refrigerant circuit.

The compressor 101A in the heat-source-side unit 100A applies pressure to refrigerant, and the obtained high-temperature, high-pressure gas refrigerant flows into the header 132 through the four-way valve 102A. The compressor 101B in the heat-source-side unit 100E applies pressure to refrigerant, and the obtained high-temperature, high-pressure gas refrigerant flows into the header 132 through the four-way valve 102B. The refrigerant obtained by the compressor 101A applying pressure and the refrigerant obtained by the compressor 101B applying pressure combine in the header 132, and the combined refrigerant flows into the load-side unit 200.

When the refrigerant that has flowed into the load-side unit 200 passes through the load-side heat exchanger 201, heat is exchanged between the refrigerant and the indoor air. Thus, the refrigerant releases heat and condenses. The load-side expansion device 202 controls the pressure of the refrigerant flowing into the load-side heat exchanger 201. Intermediate-pressure liquid refrigerant or two-phase gas-liquid refrigerant that has passed through the load-side heat exchanger 201 is divided into portions in the header 134, and the divided portions of the refrigerant flow into the heat-source-side unit 100A and the heat-source-side unit 100B.

When the refrigerant that has flowed into the heat-source-side unit 100A passes through the heat-source-side heat exchanger 103A, and when the refrigerant that has flowed into the heat-source-side unit 100B passes through the heat-source-side heat exchanger 103B, heat is exchanged between the refrigerant and the outdoor air. Thus, the refrigerant evaporates into gas refrigerant. The gas refrigerant is suctioned into the compressor 101A via the four-way valve 102A and the accumulator 104A, and the gas refrigerant is suctioned into the compressor 101B via the four-way valve 102B and the accumulator 104B. The compressor 101A applies pressure again to the suctioned refrigerant and then discharges the refrigerant. The compressor 101B applies pressure again to the suctioned refrigerant and then discharges the refrigerant.

[Air-Conditioning Apparatus Defrosting Mode Operation]

Figure 4:
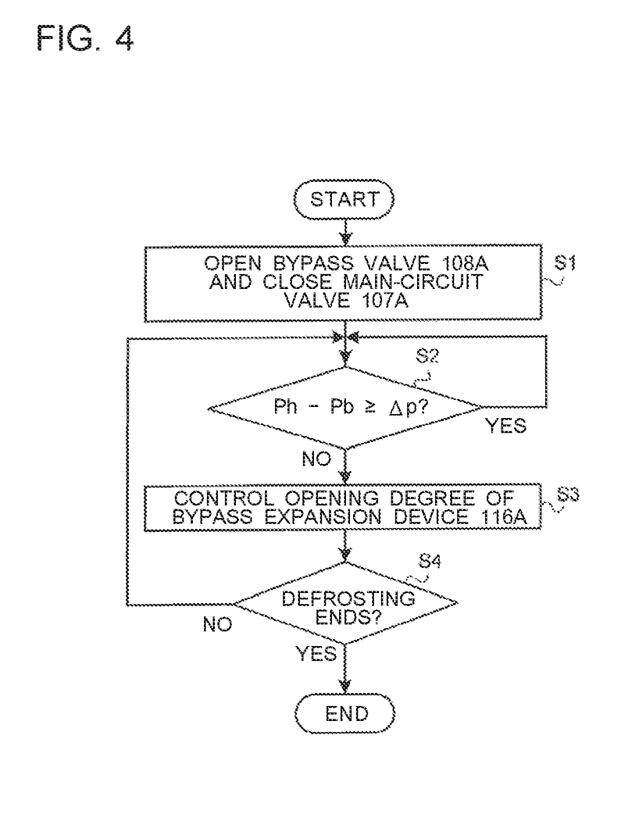
FIG. 4 is a flowchart illustrating an operation procedure when the air-conditioning apparatus shown in FIG. 1 operates in defrosting mode.

Next, operation when the air-conditioning apparatus 1 in Embodiment 1 operates in defrosting mode is described with reference to FIGS. 1 and 4. FIG. 4 is a flowchart illustrating an operation procedure when the air-conditioning apparatus shown in FIG. 1 operates in defrosting mode. Here, a case is described in which the heat-source-side unit 100A operates in defrosting mode while the heat-source-side unit 100B is operating in heating mode. In an initial state, the main-circuit valve 107A and the main-circuit valve 107E are open and the bypass valve 108A and the bypass valve 108B are closed in accordance with control performed by the flow-path control unit 32.

When the heat-source-side unit 100A operates in defrosting mode, the controller 20 opens the bypass valve 108A and closes the main-circuit valve 107A (step S1). With this operation, a portion of high-temperature refrigerant discharged from the compressor 101A flows into the heat-source-side heat exchanger 103A via the bypass valve 108A. It should be noted that the remaining high-temperature refrigerant discharged from the compressor 101A except for the portion of refrigerant flowing into the heat-source-side heat exchanger 103A flows into the load-side heat exchanger 201 in the load-side unit 200 via the refrigerant pipe 152A and the header 132.

When the high-temperature refrigerant flows into the heat-source-side heat exchanger 103A, heat is exchanged between the refrigerant and frost formed on the heat-source-side heat exchanger 103A. Specifically, the frost formed on the heat-source-side heat exchanger 103A receives the heat of the high-temperature gas refrigerant. The frost formed on the heat-source-side heat exchanger 103A melts and flows away, accordingly. Here, as the main-circuit valve 107A is closed as described above, the refrigerant through defrosting does not flow into the accumulator 104A, but is decompressed by the bypass expansion device 116A, flows through the refrigerant pipe 155A and the refrigerant pipe 160A, and then reaches the header 134. It should be noted that the controller 20 may stop the air-sending device 109A in the heat-source-side unit 100A operating in defrosting mode. In this case, deterioration of defrosting capacity due to absorption of the heat of the outdoor air can be reduced.

The controller 20 reads the value of the pressure Pb from the bypass pressure sensor 114A and reads the value of the pressure Ph from the discharge pressure sensor 142A. The controller 20 determines whether or not a value representing a difference between the pressure Ph and the pressure Pb is equal to or greater than the predetermined value $\Delta p$ (step S2). When a value obtained by subtracting the pressure Pb from the pressure Ph is equal to or greater than the predetermined value $\Delta p$, the controller 20 continues to monitor the pressure Pb. As a result of determining at step S2, the value obtained by subtracting the pressure Pb from the pressure Ph is less than the predetermined value $\Delta p$, the controller 20 controls the opening degree of the bypass expansion device 116A in such a manner that the value obtained by subtracting the pressure Pb from the pressure Ph is equal to or greater than the predetermined value $\Delta p$ (step S3). This is because when the pressure in the heat-source-side heat exchanger 103A decreases to as low as the suction pressure of the compressor 101A, the heat of the refrigerant exchanged in defrosting mode is only the sensible heat, and thus high defrosting capacity cannot be achieved against the flow rate of refrigerant.

The pressure of refrigerant in a heat exchanger to be defrosted affects defrosting capacity in defrosting mode and heating capacity in heating mode. When the pressure of refrigerant in the heat exchanger to be defrosted is low, the saturation temperature of the refrigerant when the heat exchanger is defrosted is lower than the outdoor air temperature. Thus, the latent heat of the refrigerant cannot be used, thereby decreasing the defrosting capacity. Meanwhile, the higher the pressure of the refrigerant in the heat exchanger to be defrosted, the higher the saturation temperature of the refrigerant in the heat exchanger to be defrosted. Thus, the latent heat of the refrigerant can be used in defrosting, thereby increasing the defrosting capacity. However, a larger amount of refrigerant condenses in the heat exchanger to be defrosted, and another heat-source-side unit operating in heating mode is thus deficient in refrigerant. As a result, sufficient heating capacity cannot be achieved. Thus, the most efficient operation state in terms of defrosting capacity and heating capacity can be achieved by causing the pressure of the refrigerant in the heat exchanger to be defrosted to be pressure at which the refrigerant in the system can be used in proper quantity (excess refrigerant is stored in the heat exchanger to be defrosted).

To defrost the heat exchanger using the latent heat of the refrigerant, the pressure in the heat exchanger to be defrosted is only required to be pressure at which a portion of gas refrigerant flowing from the compressor into the heat exchanger liquefies. In Embodiment 1, the controller 20 controls the opening degree of the bypass expansion device 116A to narrow the flow path of gas refrigerant flowing out from the heat-source-side heat exchanger 103A, which enables the heat-source-side heat exchanger 103A to act like a condenser. With this operation, a portion of the gas refrigerant liquefies in the heat-source-side heat exchanger 103A. Specifically, the pressure control unit 33 controls the opening degree of the bypass expansion device 116A in such a manner that the value obtained by subtracting the pressure Pb from the pressure Ph corresponds to a value at which a portion of the gas refrigerant liquefies in the heat-source-side heat exchanger 103A. The memory 21 may pre-store a relationship between the value obtained by subtracting the pressure Pb from the pressure Ph and the opening degree of the bypass expansion device 116A.

However, it is not necessary to liquefy all of the gas refrigerant in the heat-source-side heat exchanger 103A. For instance, by stopping the air-sending device 109A as described above, it is possible to avoid excessively liquefying the gas refrigerant.

With reference back to FIGS. 1 and 4, while the heat-source-side unit 100A is operating in defrosting mode, the heat-source-side unit 100B operates in heating mode. That is, the high-temperature, high-pressure gas refrigerant obtained by the compressor 101B applying pressure flows into the load-side heat exchanger 201 in the load-side unit 200 through the header 132 and the refrigerant pipe 105. Intermediate-pressure liquid refrigerant or two-phase gas-liquid refrigerant that has passed through the load-side heat exchanger 201 flows through the refrigerant pipe 106 and reaches the header 134.

In the header 134, the refrigerant that has passed through the heat-source-side heat exchanger 103A that operates in defrosting mode combines with the refrigerant that has returned from the load-side unit 200 through the refrigerant pipe 106. When the combined refrigerant passes through the heat-source-side heat exchanger 103B in the heat-source-side unit 100B, heat is exchanged between the refrigerant and the outdoor air. Thus, the refrigerant evaporates into gas refrigerant. As the heat-source-side heat exchanger 103B in the heat-source-side unit 100B operating in heating mode acts as an evaporator, the air-sending device 109B should preferably be operated to improve evaporation performance.

A portion of the gas refrigerant that has passed through the heat-source-side heat exchanger 103B returns to the compressor 101B via the refrigerant pipe 153B, the refrigerant pipe 154B, the refrigerant pipe 156B, and the accumulator 104B. The remaining portion of the gas refrigerant that has passed through the heat-source-side heat exchanger 103B returns to the heat-source-side unit 100A through the connection pipe 113. Specifically, the refrigerant that has passed through the connection pipe 113 returns to the compressor 101A via the refrigerant pipe 154A, the refrigerant pipe 156A, and the accumulator 104A. The compressor 101A and the compressor 101B each suction the returned refrigerant, apply pressure to the refrigerant, and then discharge the refrigerant.

In the procedure shown in FIG. 4, the controller 20 repeats the processing of step S2 and the processing of step S3 until defrosting ends (step S4). Defrosting ends, for example, when a predetermined time has elapsed since the start of the defrosting mode, when the remote control (not shown) inputs an instruction to end the defrosting mode, and when another heat-source-side unit needs to operate in defrosting mode.

In the above description with reference to FIGS. 1 and 4, the heat-source-side unit 100A operates in defrosting mode, and the heat-source-side unit 100E operates in heating mode. However, the heat-source-side unit 100B may operate in defrosting mode, and the heat-source-side unit 100A may operate in heating mode. In such a manner, either the heat-source-side unit 100A or the heat-source-side unit 100B operates in defrosting mode, and the other unit operates in heating mode, which enables the air-conditioning apparatus to concurrently operate in heating mode and defrosting mode.

When there are three or more heat-source-side units, some of the heat-source-side units that operate in defrosting mode are only required to operate in the same manner as does the heat-source-side unit 100A, and the remaining heat-source-side units that operate in heating mode are only required to operate in the same manner as does the heat-source-side unit 100B. When the total number of the heat-source-side units is Xt, the number of heat-source-side units that operate in heating mode among Xt heat-source-side units is Xw, and the number of heat-source-side units that operate in defrosting mode among Xt heat-source-side units is Xd, a relationship between Xw and Xd should preferably be expressed by Xw≥Xd and Xt=Xw+Xd.

The air-conditioning apparatus in Embodiment 1 includes the heat-source-side unit 100A, the heat-source-side unit 100B, the load-side unit 200, the header 132, the header 134, the bypass expansion device 116A, the bypass expansion device 116B, the circuit switching unit 117A, the circuit switching unit 117B, the discharge pressure sensor 142A, the discharge pressure sensor 142B, the bypass pressure sensor 114A, the bypass pressure sensor 114B, and the controller 20. The header 132 connects the refrigerant pipe 105 connected to the load-side heat exchanger 201 and connects a refrigerant pipe connected to the compressor 101A and a refrigerant pipe connected to the compressor 101B. The header 134 connects the refrigerant pipe connected to the load-side expansion device 202 and connects a refrigerant pipe connected to the heat-source-side heat exchanger 103A and a refrigerant pipe connected to the heat-source-side heat exchanger 103B. The bypass expansion device 116A is provided between the heat-source-side heat exchanger 103A and the header 134. The bypass expansion device 116B is provided between the heat-source-side heat exchanger 103B and the header 134. The circuit switching unit 117A connects the heat-source-side heat exchanger 103A to the suction portion or discharge portion of the compressor 101A. The circuit switching unit 117B connects the heat-source-side heat exchanger 103B to the suction portion or discharge portion of the compressor 101B. The discharge pressure sensor 142A is provided to the discharge portion of the compressor 101A. The discharge pressure sensor 142B is provided to the discharge portion of the compressor 101B. The bypass pressure sensor 114A is provided between the bypass expansion device 116A and the header 134. The bypass pressure sensor 114B is provided between the bypass expansion device 116B and the header 134. The controller 20 includes the flow-path control unit 32 and the pressure control unit 33. In the heat-source-side unit 100A operating in defrosting mode, the flow-path control unit 32 causes a portion of refrigerant discharged from the compressor 101A to flow into the heat-source-side heat exchanger 103A. In the heat-source-side unit 100A operating in defrosting mode, the pressure control unit 33 controls the opening degree of the expansion device 116A in such a manner that a value representing a difference between pressure measured by the discharge pressure sensor 142A and pressure measured by the bypass pressure sensor 114A is equal to or greater than a predetermined value.

In Embodiment 1, when the air-conditioning apparatus including multiple heat-source-side units causes some of the heat-source-side units to operate in defrosting mode while continuously operating in heating mode, by appropriately controlling the pressure of a heat-source-side heat exchanger to be defrosted in such a manner that a value representing a difference between the pressure of refrigerant at the downstream of the heat-source-side heat exchanger to be defrosted and the discharge pressure of the compressor is equal to or greater than a predetermined value, it is possible to not only increase defrosting capacity by liquefying a portion of the refrigerant and using the latent heat of the refrigerant, but also maintain high heating capacity.

In Embodiment 1, the flow-path control unit 32 may control the circuit switching unit 117B in the heat-source-side unit 100B in such a manner that the heat-source-side heat exchanger 103B is connected to the connection pipe 113 connected to the suction portion of each of the compressor 101A and the compressor 101B. As refrigerant used in the defrosting mode flows into the heat-source-side unit 100B via the header 134, refrigerant used in the heating mode and defrosting mode gasifies in the heat-source-side unit 100B, and the gasified refrigerant is then distributed to the heat-source-side unit 100A and the heat-source-side unit 100B through the connection pipe 113. Thus, concentration of refrigerant in the heat-source-side unit 100E that operates in heating mode can be avoided.

For the device and system disclosed in Patent Literature 1 and 2, because of a difference between the operation cycle of a heat-source-side unit in heating mode and the operation cycle of a heat-source-side unit in defrosting mode, refrigerant is concentrated in the heat-source-side unit in heating mode. When the heat-source-side unit operates in defrosting mode for a long time, the discharge temperature at the compressor of the heat-source-side unit in defrosting mode excessively increases. This operation causes, for example, inflow of a large amount of liquid (liquid flood back) to the compressor, and the compressor is no longer able to stably operate. In contrast, when the connection pipe 113 is provided in the air-conditioning apparatus, as described in Embodiment 1, refrigerant evenly returns to the heat-source-side unit 100A in defrosting mode and the heat-source-side unit 100B in heating mode, which can avoid refrigerant being concentrated in the heat-source-side unit 100E in heating mode.

In addition, in the heat-source-side unit 100A that operates in defrosting mode, the pressure control unit 33 may control the opening degree of the bypass expansion device 116A in such a manner that a difference between pressure measured by the discharge pressure sensor 142A and pressure measured by the bypass pressure sensor 114A corresponds to a value at which a portion of refrigerant in the heat-source-side heat exchanger 103A liquefies. In this case, the heat-source-side heat exchanger 103A acts like a condenser. Thus, a portion of refrigerant liquefies, and the heat-source-side heat exchanger 103A can be defrosted reliably using the latent heat of the refrigerant.

REFERENCE SIGNS LIST 1 air-conditioning apparatus 20 controller 21 memory 22 CPU 31 refrigeration-cycle control unit 32 flow-path control unit 33 pressure control unit 100A, 100B heat-source-side unit 101A, 101B compressor 102A, 102B four-way valve 103A, 103B heat-source-side heat exchanger 104A, 104B accumulator 105, 106 refrigerant pipe 107A, 107B main-circuit valve 108A, 108B bypass valve 109A, 109B air-sending device 110A, 110B heat-exchanger temperature sensor 111A, 111B inflow temperature sensor 112A, 112B discharge temperature sensor 113 connection pipe 114A, 114B bypass pressure sensor 115A, 115B bypass 116A, 116B bypass expansion device 117A, 117B circuit switching unit 120A heat-source-side housing 132, 134 header 141A, 141B inflow pressure sensor 142A, 142B discharge pressure sensor 150A to 156A, 150B to 156B, 160A, 160B refrigerant pipe 200 load-side unit 201 load-side heat exchanger 202 load-side expansion device 203 air-sending device 204 load-side housing

The invention claimed is:

1. An air-conditioning apparatus comprising:
heat-source-side units each including a compressor and a heat-source-side heat exchanger;
a load-side unit including a load-side heat exchanger and a load-side expansion device;
a first header connecting a refrigerant pipe connected to the load-side heat exchanger and connecting refrigerant pipes each connected to a corresponding one of the compressors;
a second header connecting a refrigerant pipe connected to the load-side expansion device and connecting refrigerant pipes each connected to a corresponding one of the heat-source-side heat exchangers;
bypass expansion devices each provided between the second header and a corresponding one of the heat-source-side heat exchangers;
circuit switchers each provided in a corresponding one of the heat-source-side units and each circuit switcher is configured to connect the heat-source-side heat exchanger to a suction portion of the compressor when the heat-source-side heat exchanger functions as an evaporator and connect the heat-source-side heat exchanger to a discharge portion of the compressor when the heat-source-side heat exchanger is defrosted;
a connection pipe connecting, to each other, the suction portions of the compressors that are provided in the heat-source-side units respectively;
discharge pressure sensors each provided to the discharge portion of a corresponding one of the compressors;
bypass pressure sensors each provided between the second header and a corresponding one of the bypass expansion devices; and
a controller configured to cause the heat-source-side heat exchanger in at least one of the heat-source-side units to be defrosted and cause the heat-source-side heat exchanger of at least one remaining heat-source-side unit of the heat-source-side units to act as an evaporator,
the controller
being configured to control the circuit switcher in the at least one of the heat-source-side units in such a manner that a portion of refrigerant discharged from a corresponding one of the compressors flows into a corresponding one of the heat-source-side heat exchangers, and
being configured to control an opening degree of the bypass expansion device in the at least one of the heat-source-side units in such a manner that a value representing a difference between pressure measured by a corresponding one of the discharge pressure sensors and pressure measured by a corresponding one of the bypass pressure sensors is equal to or greater than a predetermined value.

2. The air-conditioning apparatus of claim 1, wherein the controller is configured to control the circuit switcher in the at least one remaining heat-source-side unit in such a manner that a corresponding one of the heat-source-side heat exchangers is connected to the connection pipe.

3. The air-conditioning apparatus of claim 1, wherein the controller is configured to control the opening degree of the bypass expansion device in the at least one of the heat-source-side units in such a manner that a difference between pressure measured by a corresponding one of the discharge pressure sensors and pressure measured by a corresponding one of the bypass pressure sensors corresponds to a value at which a portion of the refrigerant in a corresponding one of the heat-source-side heat exchangers liquefies.

* * * * *